United States Patent
Ray et al.

(10) Patent No.: US 8,437,734 B2
(45) Date of Patent: *May 7, 2013

(54) SYSTEM AND METHOD FOR PROVIDING CONTACT INFORMATION OF A MOBILE DEVICE TO A REVERSE 911 DATABASE

(75) Inventors: Amar N. Ray, Shawnee, KS (US); Cadathur V. Chakravarthy, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,097

(22) Filed: Sep. 5, 2012

(65) Prior Publication Data

US 2012/0329422 A1 Dec. 27, 2012

Related U.S. Application Data (63) Continuation of application No. 12/255,451, filed on Oct. 21, 2008, now Pat. No. 8,280,343.

(51) Int. Cl.
*H04M 11/04* (2006.01)

(52) U.S. Cl.
USPC .............. 455/404.1; 455/435.1; 455/432.3; 379/37

(58) Field of Classification Search ............... 455/404.1, 455/435.1
See application file for complete search history.

(56) References Cited

U.S. PATENT DOCUMENTS

| | | | |
|---|---|---|---|
| 5,307,400 A | | 4/1994 | Sawyer et al. |
| 6,044,259 A | * | 3/2000 | Hentila et al. ............... 455/406 |
| 6,091,946 A | | 7/2000 | Ahvenainen |
| 6,108,537 A | * | 8/2000 | Comer et al. ............... 455/426.1 |
| 6,721,755 B1 | * | 4/2004 | Lee ........................................ 1/1 |
| 6,941,139 B1 | * | 9/2005 | Shupe et al. ............... 455/432.3 |
| 7,177,623 B2 | | 2/2007 | Baldwin |
| 7,280,830 B2 | * | 10/2007 | Anderson et al. ........... 455/435.1 |
| 7,474,894 B2 | | 1/2009 | Cardina et al. |
| 7,664,233 B1 | | 2/2010 | Kirchmeier et al. |
| 7,706,356 B1 | | 4/2010 | Olshansky et al. |
| 7,831,240 B2 | * | 11/2010 | Patron et al. ............... 455/412.1 |
| 8,280,343 B2 | | 10/2012 | Ray et al. |
| 8,412,149 | | 4/2013 | Ray et al. |
| 2004/0208295 A1 | | 10/2004 | Cacioppo et al. |
| 2004/0248570 A1 | * | 12/2004 | Denenberg et al. ........ 455/432.3 |
| 2005/0090253 A1 | * | 4/2005 | Kim et al. ................... 455/435.1 |
| 2005/0277412 A1 | * | 12/2005 | Anderson et al. ........... 455/435.1 |
| 2007/0202927 A1 | | 8/2007 | Pfleging et al. |
| 2007/0298758 A1 | * | 12/2007 | Verma et al. ............... 455/404.1 |

(Continued)

OTHER PUBLICATIONS

U.S. Appl. No. 12/255,451; Non-Final Office Action dated Jun. 9, 2011; 21 pages.

(Continued)

*Primary Examiner* — Charles Shedrick (74) *Attorney, Agent, or Firm* — Swanson & Bratschun, L.L.C.

(57) ABSTRACT

In one embodiment, when a mobile device is powered on, a mobile switching center acquires the contact information, such as, but not limited to, a phone number and the physical location associated with the mobile device. If the mobile device is a new device to the area, the contact information of the mobile device is passed to a reverse 911 database in order for a user of the mobile device to receive local alert messages transmitted by a reverse 911 system.

20 Claims, 6 Drawing Sheets

U.S. PATENT DOCUMENTS

2009/0135008 A1 5/2009 Kirchmeier et al.
2009/0248828 A1 10/2009 Gould et al.
2010/0099374 A1 4/2010 Ray et al.
2010/0099376 A1 4/2010 Ray et al.

OTHER PUBLICATIONS

U.S. Appl. No. 12/255,451; Final Rejection dated Nov. 8, 2011; 27 pages.

U.S. Appl. No. 12/255,451; Notice of Allowance dated Feb. 16, 2012; 5 pages.

U.S. Appl. No. 12/255,451; Notice of Allowance dated Jun. 6, 2012; 20 pages.

U.S. Appl. No. 12/255,451; Issue Notification dated Sep. 12, 2012; 1 page.

U.S. Appl. No. 12/255,428; Final Office Action dated Jan. 13, 2012; 19 pages.

U.S. Appl. No. 12/255,428; Non-Final Rejection dated Jun. 14, 2011; 30 pages.

U.S. Appl. No. 12/255,428, Notice of Allowance mailed Nov. 30, 2012, 27 pages.

U.S. Appl. No. 12/255,428; Issue Notification dated Mar. 13, 2013; 1 page.

* cited by examiner

SYSTEM AND METHOD FOR PROVIDING CONTACT INFORMATION OF A MOBILE DEVICE TO A REVERSE 911 DATABASE

CROSS REFERENCE TO RELATED APPLICATION

This application is a continuation of U.S. patent application Ser. No. 12/255,451, filed Oct. 21, 2008 by Amar N. Ray et al. and entitled, "System and Method for Providing Contact Information of a Mobile Device to a Reverse 911 Database," which is hereby incorporated by reference in its entirety.

BACKGROUND OF THE INVENTION

Reverse 911 is a communications tool that uses a combination of database and GIS mapping technologies to deliver outbound notifications to communities and organizations. For example, reverse 911 allows emergency services to inform the public of a known hazard and/or emergency. However, cellular or voice over IP (VoIP) phone numbers are not automatically entered in the reverse 911 system database. In some locations, if a user would like to be contacted via a cell phone by the reverse 911 system, the user may register online or by filling out a physical form with the contact information associated with a cellular device.

SUMMARY

Embodiments of the present invention include a method for automatically providing contact information of a mobile device to a reverse 911 database is presented. The method includes receiving a registration request from the mobile device at a mobile switching center. The method acquires the contact information of the mobile device and determines whether the mobile device is a new device to a wireless sub-network. In response to the mobile device being a new device to the wireless sub-network, the method passes the contact information of the mobile device from the mobile switching center to a reverse 911 database to add the contact information of the mobile device to the reverse 911 database.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE INVENTION

The disclosed embodiments recognize the problems associated with the current process of registering a mobile device, such as a cell phone, with a reverse 911 system. First and foremost, a user must be aware of the existence of the reverse 911 system and must also be aware of the ability to register a phone number of a mobile device with the reverse 911 system. Second, the process requires a user to actually manually register the mobile device. Finally, the reverse 911 system does not account for the current location of the user/mobile device at the time of an emergency. For example, suppose the user's registered location is San Diego, Calif. If the user travels to Dallas, Tex. and an emergency occurs in Dallas during his visit, notifications sent using the reverse 911 system would not be sent to the user's mobile device. Thus, certain of the disclosed embodiments provide a system and method for providing contact information of a mobile device to a reverse 911 database that may overcome one or more of the recognized disadvantages of the current system.

Figure 1:
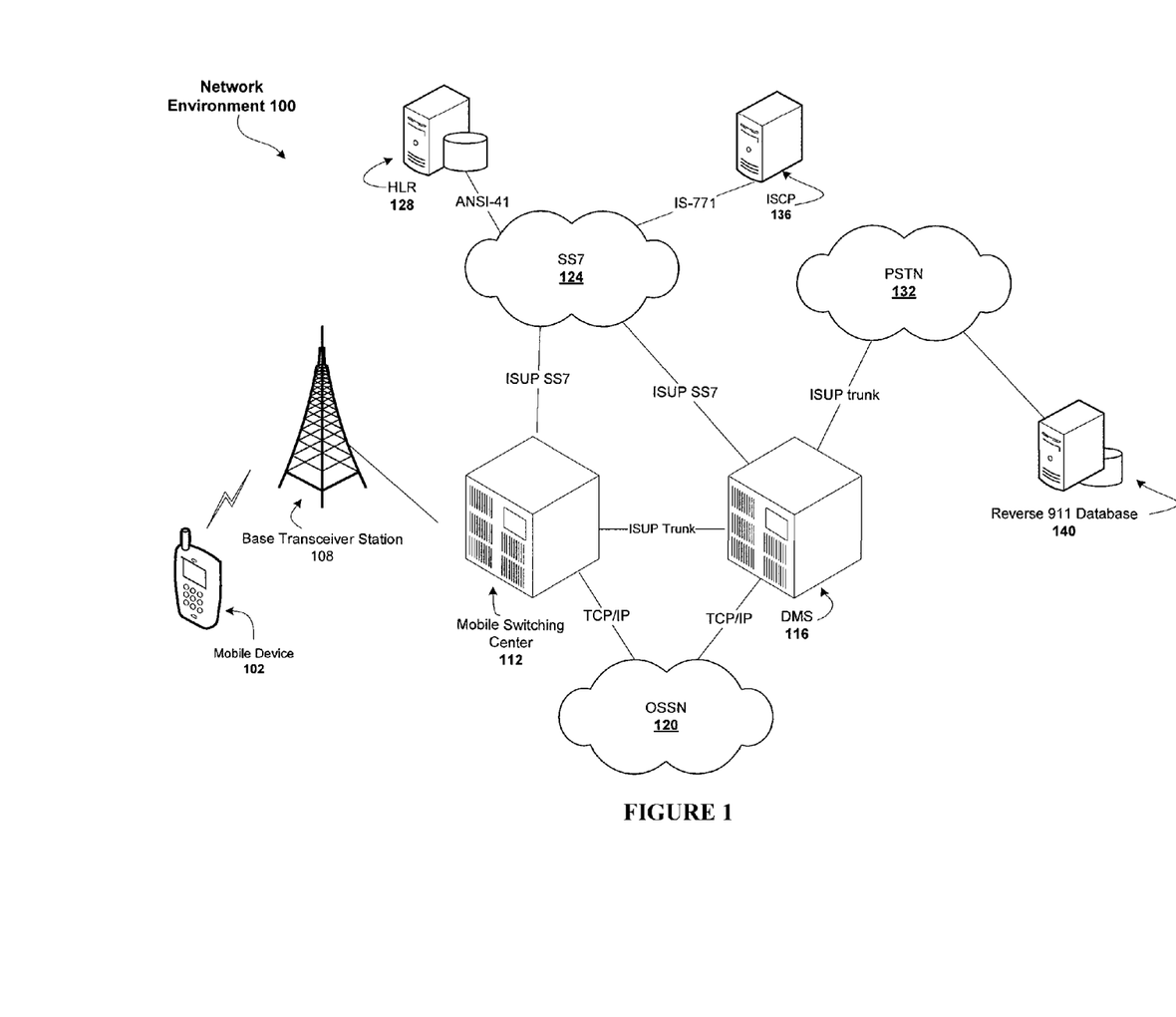
FIG. 1 depicts a standard telephone network environment in which the illustrative embodiments may be implemented.
Figure 2:
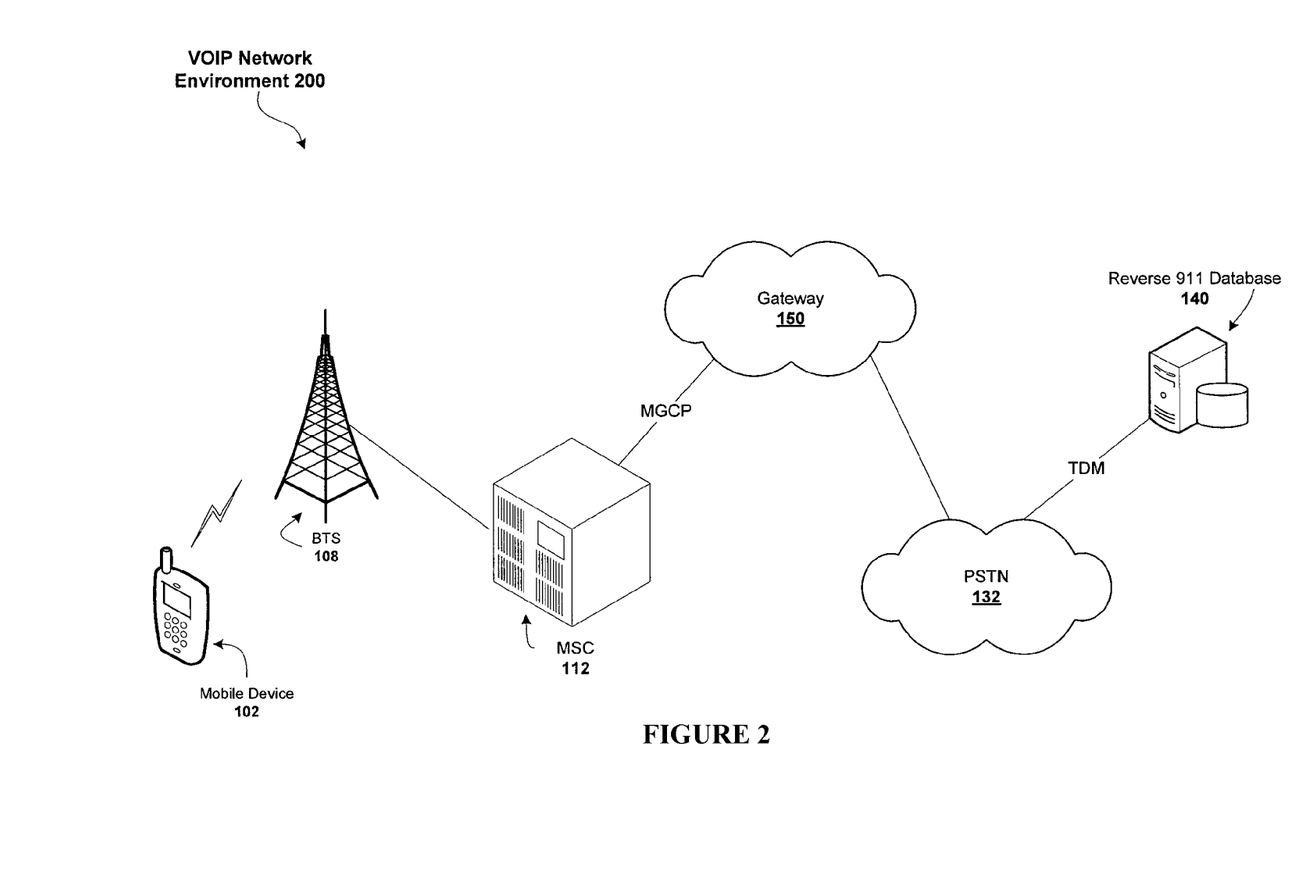
FIG. 2 depicts a Voice over IP (VOIP) network environment in which the illustrative embodiments may be implemented.
Figure 3:
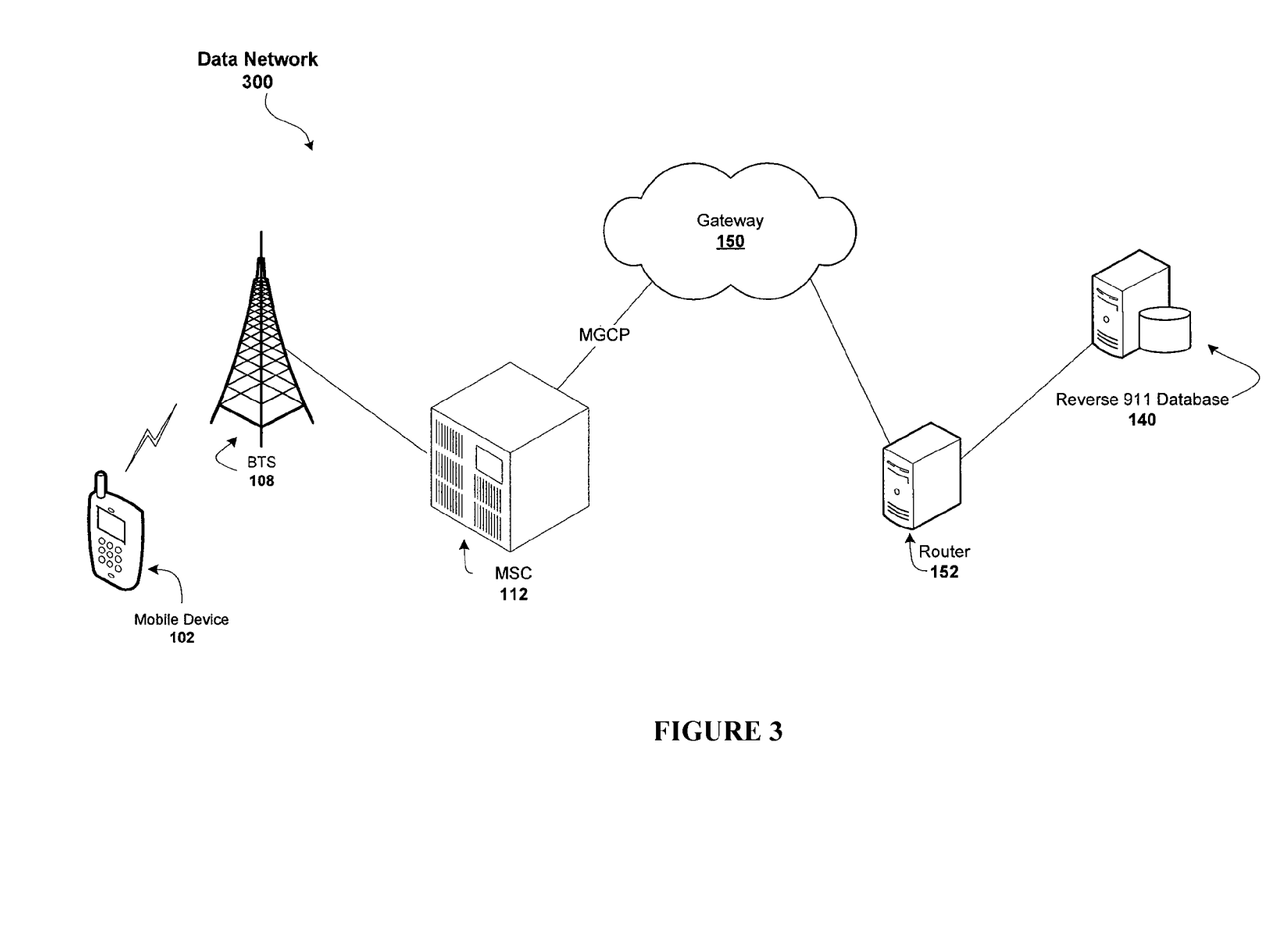
FIG. 3 depicts a data network environment in which the illustrative embodiments may be implemented.

With reference now to the figures and in particular with reference to FIGS. 1-3, exemplary diagrams of network environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a standard telephone network environment 100 in which the illustrative embodiments may be implemented to pass the contact information of a mobile device 102 from a mobile switching center 112 to a reverse 911 database 140 via a public switched telephone network (PSTN) 132. In the depicted embodiment, mobile device 102 communicates wirelessly with a base transceiver station 108. Mobile device 102 is a hand-held computing and/or communication device such as, but not limited to, cellular phones and personal digital assistants (PDAs). Mobile device 102 may be used to communicate with other mobile devices and/or computing devices over network environment 100. In some embodiments, mobile device 102 may also have wireless capability to communicate with other mobile devices and/or computing devices over the Internet. Additionally, in some embodiments, mobile device 102 may be used to send and receive faxes, email, and text messages.

Network environment 100 is divided geographically into a number of cells, each defined by a radio frequency (RF) radiation pattern from a respective base transceiver station (BTS) antenna such as, but not limited to, base transceiver station 108. Base transceiver station 108 is a piece of equipment that facilitates wireless communication between mobile device 102 and a network, such as, but not limited to, public switched telephone network (PSTN) 132. In some embodiments, base transceiver station 108 includes a transceiver, a power amplifier for amplifying the signal from the transceiver for transmission through antenna, a combiner for combining feeds from several transceivers so that they could be sent out through a single antenna, and a duplexer for separating sending and receiving signals to/from the antenna. In some embodiments, base transceiver station 108 may contain multiple antennas. The primary function of base transceiver station 108 is to maintain the air interface, or medium, for communication to any mobile device within its cell, such as, but not limited to, mobile device 102.

Mobile device 102 is associated with special codes/identifiers that are used to identify mobile device 102 and a service provider associated with mobile device 102. Additionally, in some embodiments, the special codes/identifiers may also be used to identify an owner associated with mobile device 102. In some embodiments, when mobile device 102 is powered on, mobile device 102 listens for a system identification code (SID), a unique 5-digit number that is assigned to each carrier by the FCC, on the control channel. The control channel is a special frequency that mobile device 102 and base transceiver station 108 uses to initiate communication (i.e., initiate call setup and channel changing). For example, if mobile device 102 receives an SID, mobile device 102 compares the received SID to an internally programmed SID. If the SIDs match, mobile device 102 knows that base transceiver station 108 is part of its home system. However, if mobile device 102 cannot find a control channel to listen to, mobile device 102 displays a "no service" message.

Along with the SID, mobile device 102 also transmits a registration request to mobile switching center 112 via base transceiver station 108. Mobile switching center 112 is a service delivery node for network environment 100. In one embodiment, mobile switching center 112 is responsible for handling voice calls and short message service (SMS) as well as other services, such as, but not limited to, conference calls, faxes, and circuit switched data. In addition, in some embodiments, mobile switching center 112 sets up and releases the end-to-end connection, handles mobility and hand-over requirements during the call, handles billing charges, and provides real time pre-paid account monitoring.

In one embodiment, the registration request transmitted to mobile switching center 112 includes contact information associated with mobile device 102, such as, but not limited to, the mobile directory number/mobile identification number (MIN) of mobile device 102 and an identifier of a base transceiver station transmitting the registration request, such as, but not limited to, base transceiver station 108. The MIN uniquely identifies mobile device 102 in network environment 100 and, in some embodiments, is also a network-dialable number, that is, a number that another mobile user or a landline user can dial to reach mobile device 102.

In some embodiments, mobile switching center 112 stores the contact information of mobile device 102 in a location database. Mobile switching center 112 uses this information to determine the location/cellular sub-system to route communications/calls to mobile device 102. In addition, in the depicted embodiment, mobile switching center 112 communicates with several components/networks within network environment 100 including, but not limited to, operation sub-system network (OSSN) 120, DMS250 116, SS7 124, and PSTN 132 to pass the contact information of mobile device 102 from mobile switching center 112 to reverse 911 database 140 to add the contact information of mobile device 102 to reverse 911 database 140.

Operation sub-system network 120 manages the operation and maintenance functions of network environment 100. In one embodiment, operation sub-system network 120 manages the administration of subscribers and equipment, generation and processing of statistical data, billing, and alert handling whenever unexpected events occur. In some embodiments, operation sub-system network 120 is responsible for authenticating the mobile subscribers from the data stored in home location register (HLR) 128.

Home location register 128 is the main database of permanent subscriber information for network environment 100. For example, home location register 128 is an integral component of CDMA (code division multiple access), TDMA (time division multiple access), and GSM (Global System for Mobile communications) networks. Home location register 128 contains user information, such as, but not limited to, account information, account status, user preferences, features subscribed to by the user, and user's current location. In some embodiments, home location register 128 is maintained by the subscriber's home carrier or the network operator where the user initiated the call. Mobile switching center 112 may also use home location register 128 to determine whether or not a call is initiated from a device's home area.

In addition, in some embodiments, mobile switching center 112 communicates with a SS7 network 124. SS7 network 124 is a system that places the information required to set up and manage telephone calls in a separate network rather than within the same network that the telephone call is made on. For example, in some embodiments, SS7 network 124 uses out-of-band signaling. Out-of-band signaling means that signaling (control) information travels on a separate dedicated channel rather than within the same channel as the telephone call. SS7 network 124 enables telephone calls to be set up more efficiently and with greater security by routing traffic using packet switches called signal transfer points (STPs). Further, SS7 network 124 enables efficient addition and management of special services, such as, but not limited to, call forwarding and wireless roaming service.

Digital multiplex system (DMS) 116 is a telephone exchange or telephone switch system comprising of electronic components that are used to connect telephone calls. In one embodiment, digital multiplex system 116 is a DMS-250. The DMS-250 is a high-capacity long-distance tandem switching system that provides high-speed message handling capacity for long distance voice and data communications.

In some embodiments, multiple network switches, such as, but not limited to, mobile switching center 112 and digital multiplex system 116 communicate with an incumbent local exchange carrier (ILEC) Service Control Point (ISCP) 136 for service-related information via SS7 network 124. ISCP 136 provides the intelligence of network environment 100 and is used to control the services provided in network environment 100. In one embodiment, ISCP 136 queries a service data point (SDP) to identify the geographical number to which a call is to be routed. In some embodiments, ISCP 136 may also communicate with an "intelligent peripheral" (IP) to play voice messages, or prompt for information to the user, such as prepaid long distance using account codes.

Public switched telephone network (PSTN) 132 is the world's collection of interconnected voice-oriented public telephone networks. The public circuit-switched telephone networks are connected together by trunks (i.e., analog and/or digital phone lines). PSTN 132 routes calls by creating a path from one network to another for the duration of each call. For example, in one embodiment, PSTN 132 routes calls by using a routing table that contains the pre-defined routes for a connection.

In network environment 100, PSTN 132 provides a connection to reverse 911 database 140. Reverse 911 database 140 stores the contact information, such as, but not limited to, the phone numbers of landlines. In an emergency situation, using the reverse 911 system, calls are placed to the telephones having contact information stored in reverse 911 database 140. Currently, software exists for automatically entering the contact information of landlines to reverse 911 database 140. However, the contact information of mobile devices, such as, but not limited to, cellular phones have to be manually added to reverse 911 database 140 in order for a cellular phone to be notified.

Accordingly, the disclosed embodiments present a system and method for automatically providing contact information of a mobile device, such as, but not limited to, mobile device 102 to reverse 911 database 140. For example, in one embodiment, mobile switching center 112 receives a registration request from mobile device 102. Mobile switching center 112 acquires the contact information of mobile device 102 and determines whether mobile device 102 is a new device to a wireless sub-network in which base transceiver station 108 is located. In response to mobile device 102 being a new device to the wireless sub-network of base transceiver station 108, mobile switching center 112 passes the contact information of mobile device 102 from mobile switching center 112 to reverse 911 database 140 to add the contact information of mobile device 102 to reverse 911 database 140. For example, in some embodiments, reverse 911 database 140 may be associated with a phone number. Mobile switching center 112 connects to reverse 911 database 140 by calling the phone number of reverse 911 database 140. In some embodiments, mobile switching center 112 passes the contact information of mobile device 102 to reverse 911 database 140 by, but not limited to, including the contact information of mobile device 102 in a text message or by passing the contact information of mobile device 102 in a digital data format recognizable by reverse 911 database 140.

FIG. 2 depicts a VOIP network environment 200 in which the illustrative embodiments may be implemented. Similar to network environment 100, in VOIP network environment 200, mobile device 102 communicates with base transceiver station 108. Base transceiver station 108 in turn communicates with mobile switching center 112.

However, in VOIP network environment 200, mobile switching center 112 utilizes the media gateway control protocol (MGCP) to communicate with media gateway 150. MGCP is a signaling and call control protocol used within a distributed Voice over IP system. Media gateway 150 performs the conversion of media signals between circuits and packets. In one embodiment, mobile switching center 112 uses MGCP to tell media gateway 150 what events should be reported to mobile switching center 112, how endpoints should be connected together, and what signals should be played on endpoints. Media gateway 150 uses MGCP to report events/acknowledgment, such as, but not limited to, off-hook events or dialed digits to mobile switching center 112. Additionally, in some embodiments, depending on the wireless and wireline integration service architecture, mobile switching center 112 may utilize communication protocols other than MGCP, such as, but not limited to, session initiation protocol (SIP) for communicating with media gateway 150. SIP is a signaling protocol, widely used for setting up and tearing down multimedia communication sessions such as voice and video calls over the Internet.

Media gateway 150 communicates with PSTN 132 as described in FIG. 1. In one embodiment of network environment 200, PSTN 132 utilizes time-division multiplexing (TDM) to communicate with reverse 911 database 140. Time-division multiplexing is a type of digital and/or analog multiplexing in which two or more signals or bit streams are transferred apparently simultaneously as sub-channels in one communication channel. The circuit that combines signals at the source/transmitting end of a communications link is known as a multiplexer. Each individual data stream is reassembled at the receiving end by a demultiplexer based on the time intervals of the data stream. For instance, in one embodiment, PSTN 132 receives the contact information of mobile device 102 from mobile switching center 112 via media gateway 150. PSTN 132 utilizing TDM technology communicates the contact information of mobile device 102 to reverse 911 database 140. Reverse 911 database 140 reassembles the data stream containing the contact information of mobile device 102 and adds the contact information of mobile device 102 to reverse 911 database 140.

FIG. 3 depicts data network environment 300 in which the illustrative embodiments may be implemented. Data network environment 300 is similar in respect to VOIP network environment 200 except that mobile switching center 112 passes the contact information of mobile device 102 to reverse 911 database 140 via a router 152. Router 152 is a device that determines the next network point to which a packet should be forwarded toward its destination. In other words, router 152 determines the network path within data network environment 300 to route the contact information of mobile device 102 to reverse 911 database 140. For instance, in some embodiments, router 152 may create or maintain a table of the available routes and their conditions. Router 152 uses this information along with distance and cost algorithms to determine the best route for a given packet.

In some embodiments, router 152 utilizes layers 2 and 3 of the commonly-referenced multilayered Open Systems Interconnection (OSI) communication model. Layer 2 refers to the Data Link layer. The Data Link layer is concerned with moving data across the physical links in the network. The Data Link layer ensures that an initial connection has been set up, divides output data into data frames, and handles the acknowledgements from a receiver that the data arrived successfully. It also ensures that incoming data has been received successfully by analyzing bit patterns at special places in the frames. Layer 3 refers to the network layer. The network layer is concerned with knowing the address of the neighboring nodes in the network, selecting routes and quality of service, and recognizing and forwarding to the transport layer incoming messages for local host domains.

Figure 4:
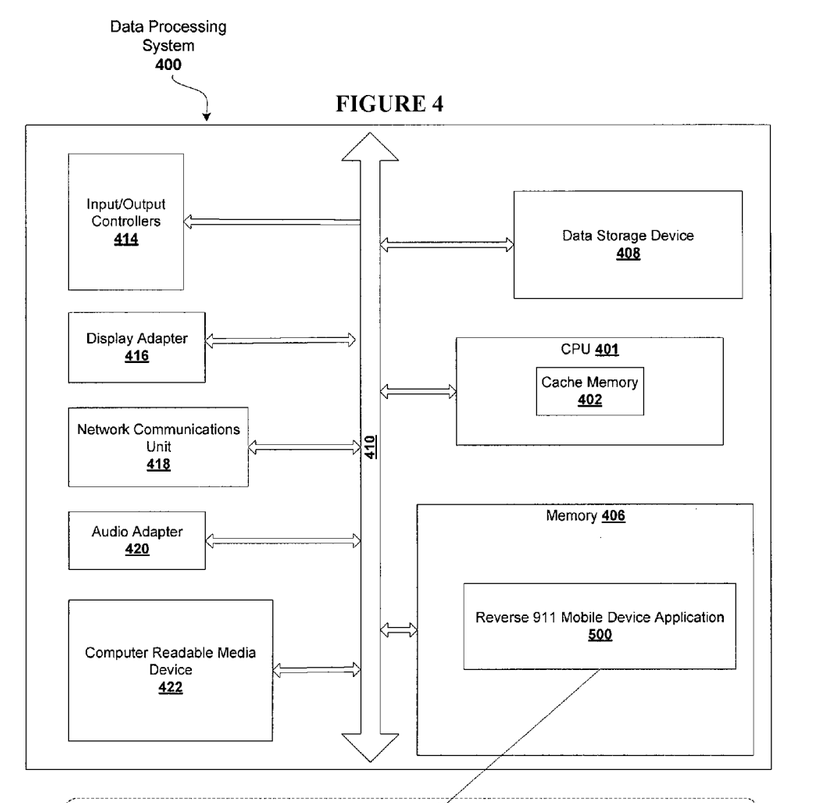
FIG. 4 depicts a data processing system in which the illustrative embodiments may be implemented.

With reference now to FIG. 4, an embodiment of a data processing system 400 in which the illustrative embodiments may be implemented is presented. In this embodiment, data processing system 400 includes communications bus 410, which provides communications between central processing unit (CPU) 401, memory 406, data storage device 408, input/output (I/O) controllers 414, display adapter 416, network communications unit 418, audio adapter 420, and computer readable media device 422.

CPU 401 executes instructions for software that may be loaded into memory 406. CPU 401 may be a set of one or more processors or may be a multi-processor core, depending on the particular implementation. Further, CPU 401 may include one or more levels of cache memory, such as, but not limited to, cache memory 402. Cache memory 402 is used by CPU 401 to store copies of the data from the most frequently used main memory locations to reduce the average time to access memory.

Memory 406 is used to retain digital data used for processing. In some embodiments, memory 406 may be a random access memory (RAM). RAM memory allows the stored data to be accessed in any order as opposed to storage mechanisms, such as tapes and magnetic discs. In addition, memory 406 may include any other suitable volatile or non-volatile storage device.

CPU 401 loads computer executable instructions, such as, but not limited to, reverse 911 mobile device application 500 into memory 406 for execution. As will be further described, in some embodiments, reverse 911 mobile device application 500 may include one or more modules containing computer executable instructions for providing contact information of a mobile device to a reverse 911 database. In addition, in some embodiments, CPU 401 in executing computer executable instructions associated with reverse 911 mobile device application 500 may execute instructions for sending and/or retrieving data from one or more computing devices. Further, in some embodiments, CPU 401 may execute in parallel with one or more processors on the same and/or different computing device in connection with executing the instructions associated with reverse 911 mobile device application 500.

Data storage device 408 may take various forms depending on the particular implementation. For example, data storage device 408 may be a hard drive, flash memory, rewritable optical disk, rewritable magnetic tape, or some combination thereof. The media used by data storage device 408 also may be removable, such as, but not limited to, a removable hard drive.

Input/output unit 414 may include one or more of the same and/or different types of data ports used for connecting external devices to data processing system 400. Input/output unit 414 may include a serial port, a parallel port, an accelerated graphics port, and most commonly a universal serial bus (USB) port. For example, input/output unit 414 may be used to connect computer peripherals, such as mice, keyboards, PDAs, gamepads and joysticks, scanners, digital cameras, printers, personal media players, and flash drives.

Display adapter 416 is used to generate and output images to a display. Display adapter 416 may be a dedicated expansion card that is plugged into a slot on the motherboard of data processing system 400 or may a graphics controller integrated into the motherboard chipset. In addition, display adapter 416 may include dedicated memory and one or more processing units.

Network communications unit 418 provides for communications with other data processing systems or devices. In some embodiments, network communications unit 418 is a network interface adapter. Modems, cable modem, Ethernet cards, and wireless interface cards are just a few of the currently available types of network interface adapters. Network communications unit 418 may provide communications through the use of physical and/or wireless communications links.

Audio adapter 420 facilitates the input and output of audio signals to and from data processing system 400. For example, audio adapter 420 may provide the audio component for receiving voice data from mobile device 102. In some embodiments, audio adapter 420 may be an expansion card added to data processing system 400 to provide for audio capability.

Computer readable media device 422 provides a mechanism for reading and writing to tangible forms of computer media, such as, but not limited to, a floppy disc, a compact disc (CD), a digital versatile disc (DVD), and memory cards. For example, CPU 401 may use computer readable media device 422 to read instructions stored on a computer media for executing the computer executable instructions of reverse 911 mobile device application 500.

The different components illustrated for data processing system 400 are not meant to provide architectural limitations to the manner in which different embodiments may be implemented. For example, the different illustrative embodiments may be implemented in a data processing system including components in addition to or in place of those illustrated for data processing system 400.

Figure 5:
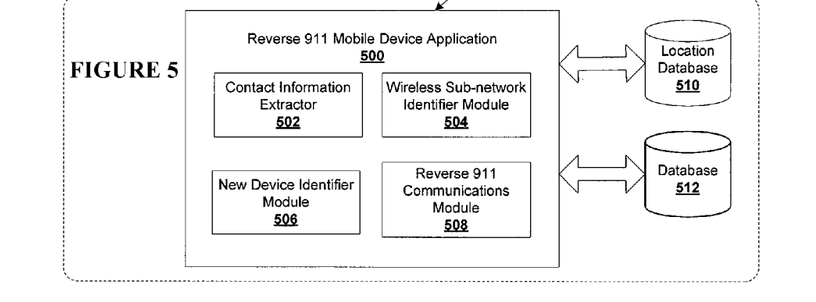
FIG. 5 depicts an embodiment of a Reverse 911 Mobile Device Application in accordance with the illustrative embodiments.

FIG. 5 is an embodiment of a reverse 911 mobile device application 500 for automatically providing contact information of a mobile device to a reverse 911 database. In one embodiment, reverse 911 mobile device application 500 includes, among other modules, a contact information extractor 502, a wireless sub-network identifier module 504, a new device identifier module 506, and a reverse 911 communications module 508.

Contact information extractor 502 extracts contact information associated with a mobile device (e.g., mobile device 102), such as, but not limited to, the mobile directory number/mobile identification number (MIN) of mobile device 102. In some embodiments, contact information extractor 502 may encrypt/decrypt the contact information of mobile device 102. In addition, in some embodiments, contact information extractor 502 extracts an identifier of a base transceiver station transmitting the signal of mobile device 102 (e.g., base transceiver station 108). Further, in some embodiments, contact information extractor 502 stores the contact information of mobile device 102 in a location database 510. Mobile switching center 112 uses the data stored in location database 510 to determine the location/cellular sub-system to route communications/calls to mobile device 102.

Wireless sub-network identifier module 504 identifies the wireless sub-network in which the mobile device is currently located. For example, in one embodiment, wireless sub-network identifier module 504 identifies the wireless sub-network in which the mobile device 102 is currently located by matching the retrieved identifier of the base transceiver station transmitting the signal of mobile device 102 to a wireless sub-network using a data table comprising data that correlates base transceiver station identifiers to a particular wireless sub-network. As reference herein, a wireless sub-network may be a network covered by a particular base transceiver station, a collection of base transceiver stations, a geographic grouping of base transceiver stations, a local exchange carrier network, or any other network or portion thereof.

New device identifier module 506 determines whether the identified mobile device is a new device to the identified wireless sub-network. For example, in one embodiment, new device identifier module 506 uses a database 512 that includes data associating mobile devices with their last detected wireless sub-network. New device identifier module 506 compares the last detected wireless sub-network to the current wireless sub-network of an identified mobile device. If the last wireless sub-network in which the mobile device was detected is different from the current wireless sub-network, new device identifier module 506 indentifies the mobile device as a new device to the current wireless sub-network. In response to the mobile device being a new device to the current wireless sub-network, new device identifier module 506 identifies a physical location, such as, but not limited to, the county associated with current wireless sub-network.

However, if the last wireless sub-network in which the mobile device was detected is the same from the current wireless sub-network, new device identifier module 506 identifies the mobile device as a previously identified mobile device within the current wireless sub-network. In such case, reverse 911 mobile device application 500 does nothing because the information associated with the identified mobile device that is stored in reverse 911 database 140 is current.

Further, in some embodiments, new device identifier module 506 also updates database 512 with the current wireless sub-network associated with the identified mobile device. Accordingly, new device identifier module 506 may identify mobile devices traveling from one wireless sub-network to another as well as mobile devices that have not been registered by reverse 911 mobile device application 500, such as, but not limited to, a brand new mobile device (e.g., a new cellular phone).

In response to new device identifier module 506 identifying a mobile device as a new device to a wireless sub-network, reverse 911 communications module 508 passes the contact information and physical location associated mobile device 102 to reverse 911 database 140. For example, in one embodiment, reverse 911 communications module 508 passes the information to reverse 911 database 140 by calling a phone number registered with reverse 911 database 140 and transmits the information via text message to reverse 911 database 140. In another embodiment, reverse 911 communications module 508 passes the information to reverse 911 database 140 in digital data format recognizable by reverse 911 database 140 via the internet.

Further, in some embodiments, if mobile switching center 112 does not have a pre-established automated method for passing the information associated with a mobile device, mobile switching center 112 may manually pass the information associated with a mobile device to reverse 911 database 140. For example, in some embodiments, a person at mobile switching center 112 may manually call and/or may manually fill out an online entry form for providing the contact information and/or physical location associated mobile device 102 to reverse 911 database 140.

Additionally, in some embodiments, reverse 911 communications module 508 requests and/or receives an acknowledgement from reverse 911 database 140 confirming that reverse 911 database 140 has been successfully updated with the contact information and physical location associated mobile device 102. For example, in some embodiments, computer executable instructions are executed on reverse 911 database 140 to provide an acknowledgment of a successful inclusion of the contact information of the mobile device, such as, but not limited to, returning a HTTP response status code 200 OK, as defined in RFC 2616, to represent a successful inclusion of the contact information of the mobile device by reverse 911 database 140. In other embodiments, the acknowledgment of a successful inclusion by reverse 911 database 140 may be in the form a specific tone, such as, but not limited to, a tone corresponding a particular telephone key (e.g., the # key).

Further, in some embodiments, reverse 911 database 140 stores both a home location associated with a user of a mobile device and a current location of the mobile device. For instance, in the example above, if the user's registered location is San Diego, Calif. and the user is visiting Dallas, Tex. and an emergency occurs in either in Dallas and/or San Diego during his visit, notifications sent using the Reverse 911 system for either and/or both locations would not be sent to the user's mobile device. Accordingly, the disclosed embodiments enable a user to be notified while being away from home that an emergency has occurred at his home location and also enable a user to be notified if an emergency occurs at his current location.

Figure 6:
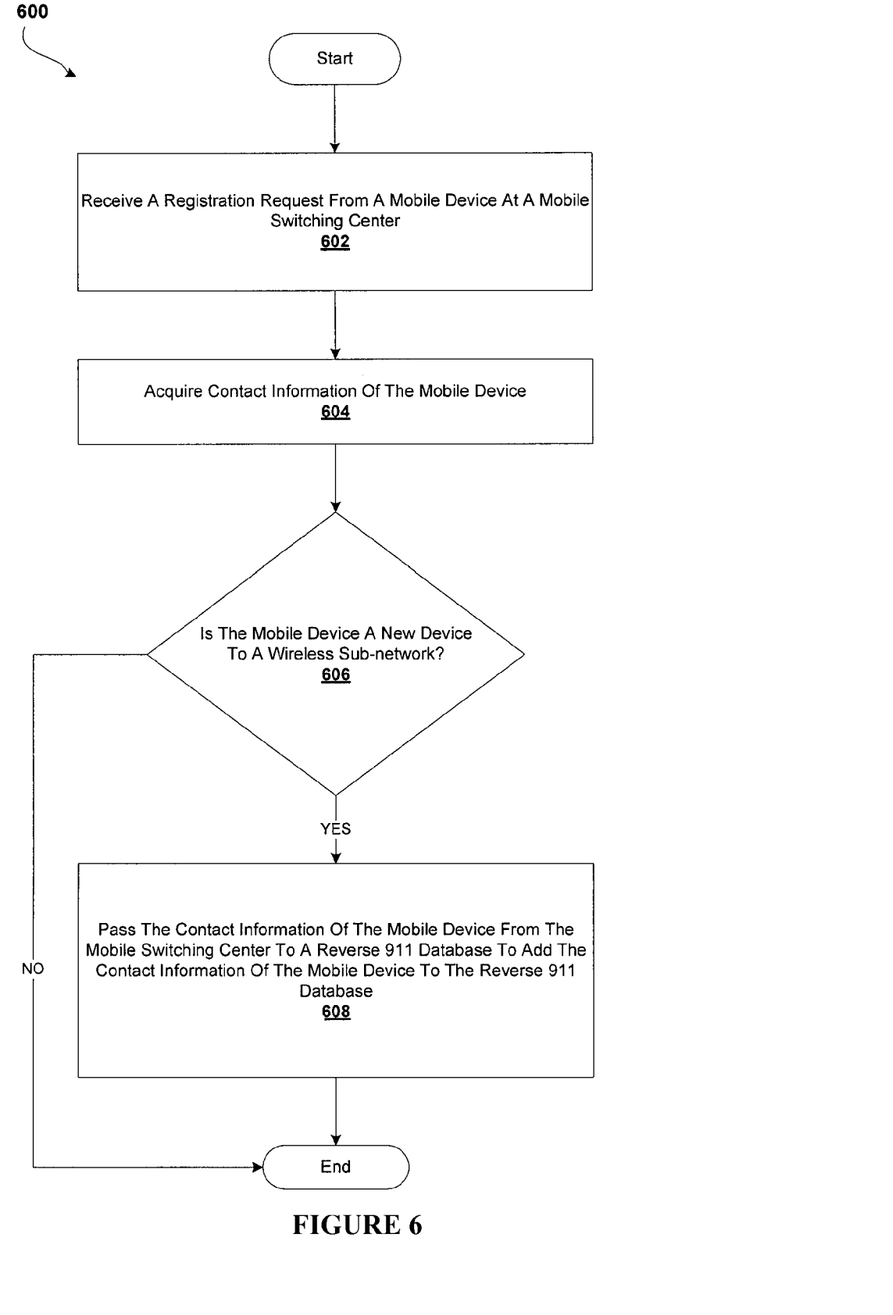
FIG. 6 depicts an embodiment of a process for providing contact information of a mobile device to a reverse 911 database.

With reference now to FIG. 6, an embodiment of a process 600 for providing contact information of a mobile device to a reverse 911 database is presented. Process 600 begins by receiving a registration request from a mobile device at a mobile switching center at step 602. At step 604, the process acquires contact information of the mobile device. The process determines, at step 606, whether the mobile device is a new device to a wireless sub-network in which the mobile device is currently located. In response to determining that the mobile device was last located within the current wireless sub-network (i.e., a previously identified mobile device within the wireless sub-network), process 600 terminates. However, if the mobile device is a new device to the current wireless sub-network, the process, at step 608, passes the contact information of the mobile device from the mobile switching center to a reverse 911 database to add the contact information of the mobile device to the reverse 911 database, with process 600 terminating thereafter.

Figure 7:
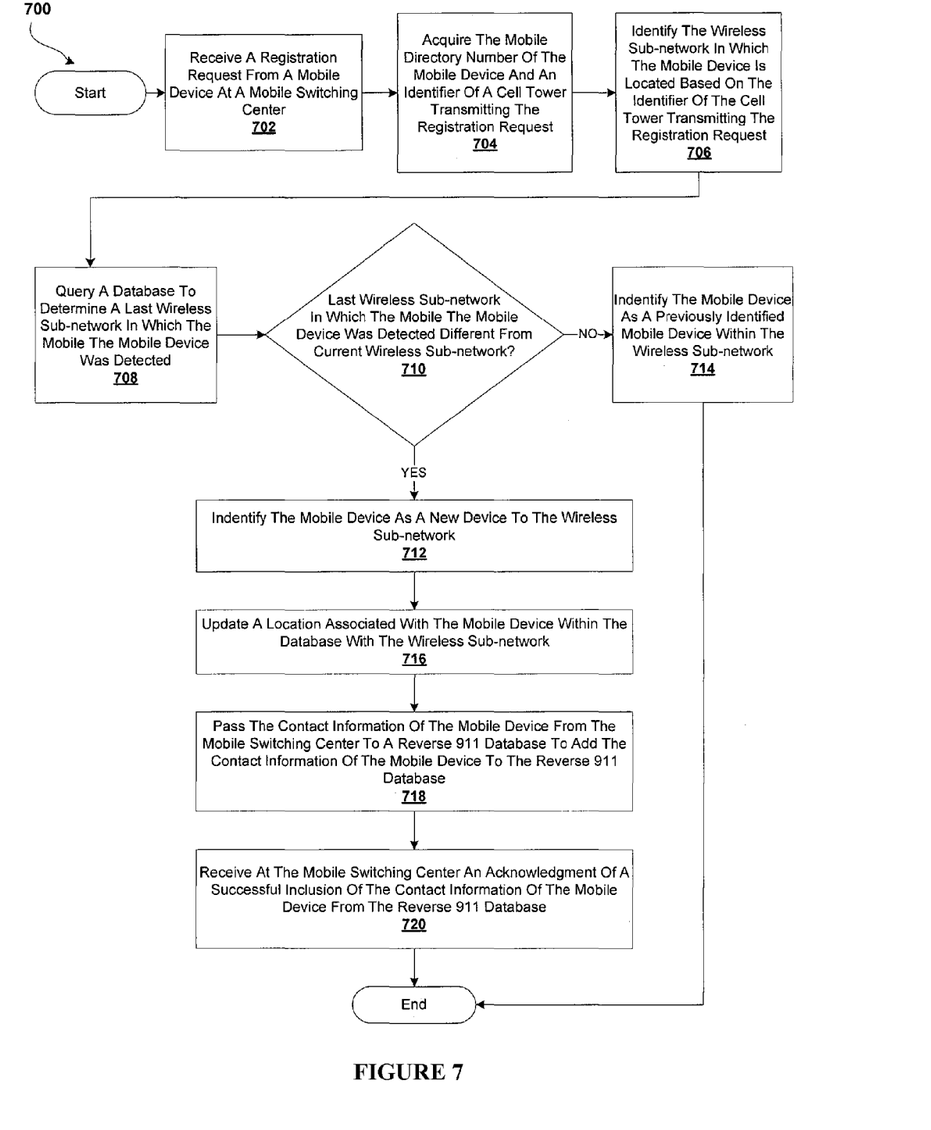
FIG. 7 depicts another embodiment of a process for providing contact information of a mobile device to a reverse 911 database.

FIG. 7 depicts another embodiment of a process 700 for providing contact information of a mobile device to a reverse 911 database. Process 700 begins by receiving a registration request from a mobile device at a mobile switching center at step 702. At step 704, the process acquires the mobile directory number of the mobile device and an identifier of a base transceiver station transmitting the registration request. The process identifies the wireless sub-network in which the mobile device is located based on the identifier of the base transceiver station transmitting the registration request at step 706. At step 708, the process queries a database to determine a last wireless sub-network in which the mobile device was detected. The process, at step 710, determines whether the last wireless sub-network in which the mobile device was detected is different from current wireless sub-network. In response to the last wireless sub-network in which the mobile device was detected being the same as the current wireless sub-network, the process identifies the mobile device as a previously identified mobile device within the wireless sub-network at step 714, with process 700 terminating thereafter.

However, if the process determines that the last wireless sub-network in which the mobile device was detected is different from current wireless sub-network, the process indentifies the mobile device as a new device to the wireless sub-network at step 712. The process updates a location associated with the mobile device within the database with the current wireless sub-network at step 716. At step 718, the process passes the contact information of the mobile device from the mobile switching center to a reverse 911 database in order to add the contact information of the mobile device to the reverse 911 database. In some embodiments, the contact information includes the physical location of the mobile device. At step 720, the process receives at the mobile switching center an acknowledgment of a successful inclusion of the contact information of the mobile device from the reverse 911 database, with process 700 terminating thereafter. In some embodiments, if an acknowledgment is not received from the reverse 911 database within a specified period of time, such as, but not limited to, 10 seconds, process 700 may repeat step 718 and/or may attempt pass the contact information of the mobile device to the reverse 911 database at a later specified time.

Accordingly, the disclosed embodiments provide an automated method for registering the contact information of mobile devices, such as, but not limited to, cellular phone numbers with a service 911 service. In one embodiment, when a mobile device is powered on, a mobile switching center acquires the contact information, such as, but not limited to, a phone number and the physical location of the mobile device. If the mobile device is a new device to the area (e.g., a new cellular device or a mobile device associated with a traveling person), the contact information and/or physical location of the mobile device is passed to a reverse 911 database in order for a user of the mobile device to receive alert messages transmitted by a reverse 911 system in the area in which the mobile device is currently located.

In some embodiments, a service provider and/or another third party may provide as an optional service to consumers of mobile devices to have the contact information associated with their mobile device(s) automatically registered with a reverse 911 database. For example, a cellular service provider may offer this service as an option to their subscribers for a one time fee and/or for a monthly recurring charge. Thus, the contact information, such as, but not limited to, the phone number, home location, and/or physical location associated with their mobile device is automatically registered and updated with a reverse 911 database without the user having to manually register online and/or fill out a handwritten form.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of providing contact information of a mobile device to a reverse 911 database, the method comprising:
receiving, at a mobile switching center ("MSC"), a registration request from the mobile device;
acquiring, with the MSC, the contact information of the mobile device;
determining, with the MSC, that the mobile device is a new device to a wireless sub-network; and
based on a determination that the mobile device is a new device to the wireless sub-network, automatically passing, with the MSC, the contact information of the mobile device to a reverse 911 database separate from the MSC, to add the contact information of the mobile device to the reverse 911 database.

2. The method of claim 1, further comprising receiving at the MSC an acknowledgment of a successful inclusion of the contact information of the mobile device from the reverse 911 database.

3. The method of claim 1, wherein acquiring the contact information of the mobile device includes acquiring the mobile directory number of the mobile device and an identifier of a base transceiver station transmitting the registration request.

4. The method of claim 3, further comprising determining the wireless sub-network in which the mobile device is located based on the identifier of the base transceiver station transmitting the registration request.

5. The method of claim 3, wherein determining whether the mobile device is a new device to the wireless sub-network comprises:
   querying a database to determine a last wireless sub-network in which the mobile device was detected;
   responsive to the last wireless sub-network in which the mobile device was detected being different from the wireless sub-network, identifying the mobile device as a new device to the wireless sub-network.

6. The method of claim 5, further comprising responsive to identifying the mobile device as a new device to the wireless sub-network, updating a location associated with the mobile device within the database with the wireless sub-network.

7. The method of claim 5, further comprising responsive to the last wireless sub-network in which the mobile device was detected being the same as the wireless sub-network, identifying the mobile device as a previously identified mobile device within the wireless sub-network.

8. The method of claim 1, wherein the mobile switching center passes the contact information to the reverse 911 database over a public switched telephone network.

9. The method of claim 1, wherein the mobile switching center passes the contact information to the reverse 911 database over an IP-based packet-switched network.

10. The method of claim 1, further comprising registering the mobile device with a home location register.

11. The method of claim 1, wherein the reverse 911 database includes both a home location and a current location of a user of the mobile device.

12. The method of claim 1, wherein passing the contact information of the mobile device is provided as an optional service by a telecom service provider.

13. The method of claim 12, further comprising charging a fee to the consumer for the optional service.

14. The method of claim 1, further comprising automatically passing, with the MSC, updated contact information of the mobile device to the reverse 911 database, in response to a determination that the mobile device is located within a new wireless sub-network.

15. A system for providing contact information of a mobile device to a reverse 911 database, the system comprising:
   a mobile switching center ("MSC") comprising a processing unit and a memory in communication with the processing unit, the memory containing computer usable program code, the processing unit configured to execute the computer usable program code to:
   receive a registration request from the mobile device;
   acquire the contact information of the mobile device
   determine whether the mobile device is a new device to a wireless sub-network; and
   based on a determination that the mobile device is a new device to the wireless sub-network, automatically pass the contact information of the mobile device to a reverse 911 database to add the contact information of the mobile device to the reverse 911 database.

16. The system of claim 15, wherein the processing unit further executes the computer usable program code to receive an acknowledgment of a successful inclusion of the contact information of the mobile device from the reverse 911 database.

17. The system of claim 15, wherein the processing unit further executes the computer usable program code to pass the contact information of the mobile device from the MSC to the reverse 911 database over a public switched telephone network.

18. The system of claim 15, wherein the processing unit further executes the computer usable program code to pass the contact information of the mobile device from the MSC to the reverse 911 database over an IP-based packet-switched network.

19. The system of claim 15, wherein the processing unit further executes the computer usable program code to pass updated contact information of the mobile device to the reverse 911 database, in response to a determination that the mobile device is located within a new wireless sub-network.

20. An apparatus, comprising:
   a non-transitory memory containing computer usable program code executable by a processing unit in a mobile switching center ("MSC") to:
   receive a registration request from the mobile device;
   acquire the contact information of the mobile device
   determine whether the mobile device is a new device to a wireless sub-network; and
   based on a determination that the mobile device is a new device to the wireless sub-network, automatically pass the contact information of the mobile device to a reverse 911 database to add the contact information of the mobile device to the reverse 911 database.

* * * * *